MOS GATED RESISTOR MEMORY CELL

Filed Nov. 27, 1968 4 Sheets-Sheet 1

INVENTORS
HAROLD S. CRAFTS
WENDELL B. SANDER
JAMES B. ANGELL

BY Roger S. Borovoy
Alan H. MacPherson
ATTORNEYS

MOS GATED RESISTOR MEMORY CELL

Filed Nov. 27, 1968 4 Sheets-Sheet 2

INVENTORS
HAROLD S. CRAFTS
WENDELL B. SANDER
JAMES B. ANGELL
BY Roger S. Borovoy
Alan H. MacPherson
ATTORNEYS INVENTORS
HAROLD S. CRAFTS
WENDELL B. SANDER
JAMES B. ANGELL
BY Roger S. Borovoy
Alan H. MacPherson
ATTORNEYS Sept. 22, 1970 H. S. CRAFTS ET AL 3,530,443

MOS GATED RESISTOR MEMORY CELL

Filed Nov. 27, 1968 4 Sheets-Sheet 4

INVENTORS
HAROLD S. CRAFTS
WENDELL B. SANDER
JAMES B. ANGELL

BY Roger S. Borovoy
Alan A. MacPherson
ATTORNEYS

United States Patent Office 3,530,443

Patented Sept. 22, 1970

3,530,443

MOS GATED RESISTOR MEMORY CELL

Harold S. Crafts, Los Altos Hills, Wendell B. Sander, Palo Alto, and James B. Angell, Portola Valley, Calif., assignors to Fairchild Camera and Instrument Corporation, Syosset, N.Y., a corporation of Delaware Filed Nov. 27, 1968, Ser. No. 779,398

Int. Cl. G11c *11/34, 11/40*

U.S. Cl. 340—173 28 Claims

ABSTRACT OF THE DISCLOSURE

A flip-flop circuit is modified to the extent that its pair of load resistors is replaced by a pair of transistors which functions as voltage-variable resistors and as gating elements. Upon application of suitable logic input signals, the circuit operates as a complete semiconductor memory cell capable of storing the logic information applied thereto for readout at a later time. No additional components are needed, thus permitting a large number of memory cells per unit area to be integrated into a single semiconductor chip.

BACKGROUND OF THE INVENTION

Field of invention

This invention relates to a memory cell suitable for large-scale integration. More particularly, this invention relates to a memory cell comprising a modified flip-flop wherein the flip-flop operates as a complete memory cell without the need of additional components.

DESCRIPTION OF THE PRIOR ART

There is an increased need to apply large-scale integration techniques to memory arrays so that hundreds or thousands of memory cells may be fabricated onto a single semiconductor chip. The inherent advantages of integration, such as small size, high reliability, and improved performance, should be applicable to a complex array of memory cells. For the manufacture of an integrated array, components that are readily integratable, such as MOS transistors and resistors, must be used. Because the area of a chip needed for each memory cell circuit is a function of the number of components a cell must have to operate satisfactorily, it follows that the number of circuits that can be integrated into a given chip area is a function of the number of components needed per cell. In order to increase the complexity of a chip, that is, increase the number of memory cells that can be integrated per chip, it is desirable to select a circuit that can operate satisfactorily with the least number of components.

In the prior art, a semiconductor memory cell circuit typically comprises a flip-flop and a plurality of gating elements. The flip-flop stores logic information applied thereto, while the gating elements control the manner in which information is read into and out of the flip-flop. Using metal-oxide-silicon (MOS) field-effect components, the flip-flop comprises two MOS transistors having cross-coupled gate electrodes (that is, for stability, the gate electrode of each is coupled to the drain electrode of the other) and two load resistors, one for each MOS transistor. In addition, a prior-art semiconductor memory cell needs a plurality of gating elements to ensure that the read and write operations are performed satisfactorily. Consequently, in order to increase the numbe of memory cell circuits that can be fabricated onto a single semiconductor chip, it is desirable that the need for additional gating elements be eliminated.

SUMMARY OF THE INVENTION

The circuit of the invention is a complete semiconductor memory cell, capable of performing all of the functions normally associated with memory circuits, such as read in, storage, and subsequent read out of logic information. No additional components outside of the basic flip-flop are needed. Because the components selected are readily integratable, a single semi-conductor chip can comprise a large number of the memory cell circuits.

Briefly, the circuit comprises four suitably interconnected active MOS transistors and a plurality of terminals selectively coupled to the transistors. Two of the MOS transistors function both as load resistors having voltage-variable resistive values, and as gating elements. The other two MOS transistors are responsively cross-coupled to each other and to the load resistors, and function to store logic information. When signals in the form of differences in voltage levels are selectively applied to the circuit terminals, logic information may be applied to, stored in, and at a later time read out of the memory cell circuit.

DESCRIPTION OF THE PREFERRED EMBODIMENTS

Figure 1:
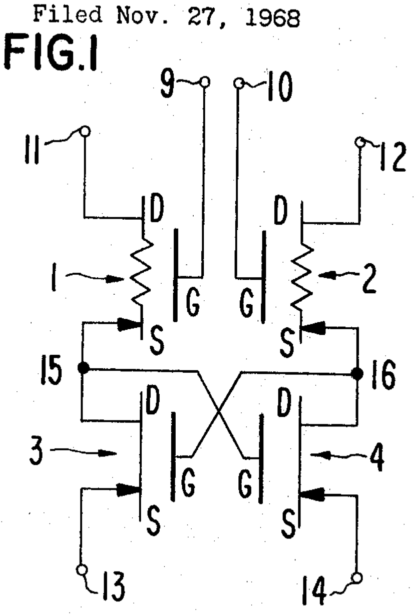
FIG. 1 is a simplified schematic circuit diagram of the basic memory cell circuit of the invention comprising components capable of being fabricated as a complete integrated circuit memory cell.

Referring to FIG. 1, the circuit of the invention comprises four MOS transistors 1 through 4, each having a drain, a source and a gate electrode (indicated in FIG. 1 by D, S and G). MOS transistors 1 and 2 function both as load resistors and as input gates in the circuit, and have resistive values that are a function of the voltage level of signals applied to the gate electrode of each. To distinguish from the other two MOS transistors, reference hereinafter will be made to first and second MOS resistors 1 and 2, which indicates one of their circuit functions. MOS transistors 3 and 4, which have cross-coupled gates, are capable of storing logic information, and are hereinafter referred to as first and second MOS transistors 3 and 4. A plurality of terminals 9 through 14 are provided for selectively applying signals to the circuit to render it operative. More specifically, terminal 9 or 10 is coupled to a respective gate electrode of MOS resistor 1 or 2, terminal 11 or 12 is coupled to a respective drain electrode of resistor 1 or 2, and terminal 13 or 14 is coupled to a respective source electrode of MOS transistor 3 or 4. Internally, the drain electrode of transistor 3 or 4 is coupled to the respective source electrode of resistor 1 or 2, and is cross-coupled to the gate electrode of the other MOS transistor.

Figure 2:
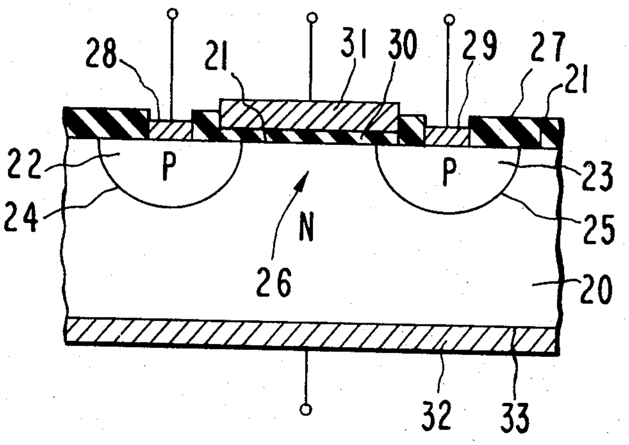
FIG. 2 is a simplified cross-sectional diagram of an MOS device suitable for use in the circuit of FIG. 1.

To understand more fully the operation of each of the active components within the circuit, reference should be made to FIG. 2. As is known in the prior art, the structure of a MOS transistor comprises a layer of semiconductor material 20 (such as silicon) of one conductivity type (such as of negative conductivity) having a surface 21. Located within the semiconductor layer 20 are respective first and second regions 22 and 23 of opposite conductivity type, each forming a respective PN junction 24 and 25 with the semiconductor layer 20, and each junction 24 and 25 having an edge at the surface 21. The first region 22 is spaced apart from the second region 23, thereby creating a channel region 26 therebetween. A protective layer 27 of dielectric material (such as silicon dioxide) overlies surface 21 and is formed to expose a portion of respective first and second regions 22 and 23. Layer 27 suitably has a thickness of approximately 10,000 angstroms. Ohmic contact is made to first and second regions 22 and 23 by respective first and second electrodes 28 and 29. Electrodes 28 and 29 typically comprise a suitable metal, such as aluminum, although a conductive semiconductor material, such as silicon with appropriate impurities deposited therein to increase conductivity, can be used. Another protective layer 30 of dielectric material overlies the surface 21 above the channel region 26. Layer 30 may comprise any suitable dielectric material, such as an oxide (thermally grown, deposited, vapor deposited and heat treated, electron beam evaporated, and so forth) or a nitride. In order to prevent unwanted and harmful inversion layers from occurring outside the vicinity of the channel region 26, it is preferable that the turn-on voltage of layer 30 be substantially less than that of layer 27. This occurs when the thickness of layer 30 is substantially less than that of layer 27. Suitably, the layer 30 thickness is on the order of about 1,500 angstroms. Located atop the protective layer 30 is a third electrode 31, which functions as a gate to control conduction across channel region 27. Typically, electrode 31 comprises a suitable metal, such as aluminum, although a conductive semiconductive material, such as silicon with appropriate impurities deposited therein, can be used. For some applications, it is desirable to locate another electrode 32, referred to as the bulk electrode, along a portion of the bottom surface 33 of the semiconductor layer 20. In the following description, the first region 22 is referred to as the drain and the second region 23 is referred to as the source of the MOS device.

The structure of FIG. 2 is that of the P-channel MOS device capable of operation in the normally off, or enhancement, mode; that is, conduction normally does not occur in channel region 26 between drain 22 and source 23 when gate electrode 31 is at a zero potential. However, when a sufficiently negative potential is applied to gate electrode 31, an inversion layer is created between drain 22 and source 23 and conduction may occur within channel region 26. The application of approximately zero potential to source 23 via electrode 29, approximately minus eight volts to drain 22 via electrode 28, and approximately zero potential to gate electrode 31, keeps the device turned off and no conduction takes place. Preferably, drain 22 and source 23 are at a negative potential with respect to the potential of the substrate of layer 20 in order to maintain electrical isolation from the substrate. The application of negative voltage, such as approximately minus sixteen volts, to the gate electrode 31 creates an inversion layer in the channel region 26 and turns the device on, thereby enabling conduction to occur between the drain 22 and source 23. In summary, when the MOS transistor is off, the resistance of the channel region 26 approaches that of an open circuit. Conversely, when the transistor is on, the channel-region resistance is determined by the voltage level of signals applied to the drain 22, source 23, and gate electrode 31.

Referring to the circuit of FIG. 1, preferably the active elements 1 through 4 are fabricated so that during the on condition, the resistance of the conductive path between the drain and source of the respective resistors 1 and 2 is approximately four to ten times the resistance of the conductive path between the drain and source of the transistors 3 and 4. In this manner, the voltage drop across resistors 1 and 2 is approximately four to ten times the voltage drop across the corresponding transistors 3 and 4. During the off-condition, of course, the resistance of all of the MOS elements approach that of an open circuit; that is, practically no conduction occurs.

As known in the art, in order to ensure proper operation of the circuit, the D.C. feedback around the circuit loop is positive so that the latching effect of a flip-flop will occur. Whenever the gain around the feedback loop is greater than one, the necessary positive feedback is obtained. However, for a margin of safety, it is preferable that the transconductance of each MOS transistor be greater than the transconductance of the respective MOS resistor by at least two to one, and preferably four to one. (Gain in MOS devices is often referred to as the transconductance, gm.) Because the geometric ratio (that is, the ratio of channel width to channel length) of an MOS device is proportional to its transconductance, when an MOS transistor has a transconductance of four times that of the respective MOS resistor, the width-to-length ratio of the transistor divided by the width-to-length ratio of the respective resistor is four. (Channel length is the distance of the signal path in the channel region between the source and drain through which current must flow. Channel width is the lateral dimension of the channel region.) Conveniently, this ratio is obtained when the resistor has a channel width that is about one-half of its channel length, whereby the width-to-length ratio is one-half. Then, if the corresponding transistor has a channel width about twice its channel length, a width-to-length ratio of two is obtained. The channel width-to-length ratio of the transistor divided by the channel width-to-length ratio of the corresponding resistor is thus four, which is sufficient to ensure positive D.C. feedback around the feedback loop. A geometric gain of four is preferable to a smaller value such as two, because of possible minor variations occurring in the electrical parameters during processing, and because the former provides a greater noise margin.

An alternative method of providing suitable feedback to ensure stability of the circuit comprises varying the thickness of the gate oxide (that is, the dielectric material 30 between the gate electrode 31 and a portion of the surface 21 overlying the channel region 26) of the resistor with respect to that of the transistor. For example, to obtain a transconductance ratio of four, if the circuit has a geometric gain of one, the components can be fabricated so that the ratio of gate oxide thickness of the resistor to that of the transistor is four. Note that an increase in gate oxide thickness causes the resistor threshold voltage to increase, although in some designs this alternative approach may allow the overall device geometry to be reduced.

Operation of the circuit of FIG. 1 commences when a potential of approximately minus eight volts is applied to the drains of MOS resistors 1 and 2 via terminals 11 and 12, and approximately zero potential is applied to the source of MOS transistors 3 and 4 via terminals 13 and 14. A potential of approximately minus sixteen volts applied to the gate of resistors 1 and 2 via terminals 9 and 10 functions to place the resistors 1 and 2 in the on condition. Once the two resistors 1 and 2 are turned on, the two internal nodes 15 and 16 can become charged. However, because of resistor noise and nonsymmetry between MOS resistors 1 and 2, one of the two internal nodes 15 or 16 charges at a faster rate than the other. When the potential of the faster charging node reaches a threshold level, say approximately minus 3.5 volts, this potential is sufficient to turn on the corresponding transistor 3 or 4 before the slower charging node reaches the threshold level. (Hereinafter, the term "threshold" shall be construed to mean approximately minus 3.5 volts, although other levels of threshold may be used without departing from the scope of the invention. Also, it should be noted that the turn-on threshold in an MOS device is a function of a number of parameters, among which are the gate oxide thickness, substrate impurity concentration, surface state charge density, work function of the gate material, substrate crystal orientation, substrate-to-source bias, and so forth.) For example, if node 15 reaches threshold before node 16, transistor 4 turns on. Once transistor 4 is turned on, conduction occurs between its drain and source, so that node 16 is electrically coupled to terminal 14. Any current leaving node 16 retards its charging rate, prevents it from reaching threshold, and holds transistor 3 off (because its gate is connected to node 16). Conversely, because the gate of transistor 4 is connected to node 15, transistor 4 is held on. All current, therefore, must flow through node 16.

The basic memory cell circuit of FIG. 1 has two different states, one of which occurs when transistor 3 is off and transistor 4 is on, and the other occurring when the opposite happens; that is, when transistor 3 is on, and transistor 4 is off. Note that the circuit is designed so that stability occurs only when the state of transistor 3 is opposite that of transistor 4. Instability, on the other hand, occurs whenever both transistors are in the same state.

The state of the circuit can be changed by a number of different techniques. As described previously, the basic circuit of FIG. 1 is rendered operative by a potential of approximately minus eight volts applied to terminals 11 and 12, approximately zero potential applied to terminals 13 and 14, and approximately minus sixteen volts applied to terminals 9 and 10 to turn on resistors 1 and 2. Also, when the basic circuit is rendered operative, it is assumed that node 15 reaches threshold first, turning on transistor 4.

One technique for switching the circuit comprises lowering the voltage on node 15 below threshold. Throughout the following description, all voltages are stated in reference to the substrate voltage, so that the terms "increasing" or "raising" means causing the voltage level (or potential) to become more negative, while "lowering" or "decreasing" means causing the voltage level to become more positive. When the potential on terminal 11 is lowered from minus eight volts to zero, the current flowing across resistor 1 is reduced, as is the voltage available to keep node 15 charged above threshold. MOS transistor 4 is turned off, which retards current flowing therein and enables current to flow into the second node 16. Node 16 charges above threshold, turning on transistor 3 and permitting current to flow out of node 15. Node 15 is held below threshold, which in turn holds transistor 4 turned off.

A second technique of switching the basic current in FIG. 1 comprises inducing current flow in transistor 3. More specifically, changing the potential on terminal 13 from zero to plus two volts allows conduction to occur in transistor 3, and thereby lowers the node 15 potential. In turn, the voltage on the gate of transistor 4 falls, causing the latter to turn-off, which retards current flow through node 16. As the potential on node 16 approaches threshold, transistor 3 is held on. Current flowing in transistor 3 reduces the node 15 potential to a level below threshold and turns off transistor 4. In turn, the voltage level at the second node 16 increases, and thus the circuit has been induced to switch states.

A third technique of switching states of the basic circuit of FIG. 1 comprises retarding current flow in transistor 4. When the potential on terminal 14 is changed from zero to minus two volts, conduction in transistor 4 is retarded and the node 16 potential rises. As this potential approaches threshold, transistor 3 turns on and conduction therein begins. As the node 15 potential drops, transistor 4 approaches the off condition, which further retards current flow therein. The cumulative effect of the above operation is to switch the circuit from one state to the other.

In the next two switching techniques, terminals 13 and 14 are at zero potential. Both MOS resistors 1 and 2 are first turned off by lowering the potential on terminals 9 and 10 from minus sixteen volts to zero. Node 16 tends to approach the potential of terminal 14 via the "on" transistor 4. Because transistor 3 is off, node 15 remains at minus eight volts. However, over a period of time, the reverse-bias leakage current in the PN junction of transistor 3 causes the potential at node 15 to drift toward zero. At room temperature, this time period is approximately one second, and decreases exponentially with temperature. However, if periodically, a potential of minus sixteen volts is applied to terminals 9 and 10 to turn-on resistors 1 and 2, then the potential on nodes 15 and 16 is restored. Note that a restoring potential must be applied to terminals 9 and 10 before the potential on node 15 drops below threshold; that is, it is necessary to keep transistor 4 on. Note also that whenever the difference between the potential on the gate and drain of an MOS resistor is less than the threshold value necessary for turn-on (typically minus 3.5 volts), the internal current of the circuit is not affected, because an MOS resistor in the on condition is saturated and operates as a current source. Consequently, both the gate and drain of an MOS resistor can be connected to the same terminal.

The fourth technique of switching the circuit of FIG. 1 comprises lowering the potential below threshold on node 15 to turn-off transistor 4, and then raising the potential on node 16 above threshold to turn-on transistor 6. This is done in two steps, the first comprising switching the on transistor off, and the second comprising switching the off transistor on. First, with the potential on terminals 9 and 10 at approximately zero (as mentioned above), and both resistors 1 and 2 are turned-off, the potential on terminals 11 and 12 is lowered from minus eight volts to zero. A potential of minus sixteen volts is then applied to terminal 9 to turn on resistor 1, so that with a zero-volt potential at terminal 11, the potential at node 15 approaches zero; as the node 15 potential drops below threshold, transistor 4 is turned off. The potential on terminal 9 is then lowered to zero to turn-off resistor 1, and the potential on terminals 11 and 12 is raised to minus eight volts. Second, a potential of minus sixteen volts is applied to terminal 10 to turn on resistor 2. With a potential of minus eight volts applied to terminal 12, with potential on node 16 via "on" resistor 2 rises above threshold. This action turns on transistor 3 and allows current flow therein, thereby holding the node 15 potential below threshold and transistor 4 off. Thus, the circuit has been switched from one state to another.

The fifth method is similar to the fourth method in that the potential on terminals 9 and 10 is lowered to zero to turn off resistors 1 and 2. Assuming that node 15 is charged and transistor 4 is on, the node 16 potential drops to zero (because transistor 4 is on), while node 15 remains at minus eight volts (because transistor 3 is off). However, a restoring voltage periodically must be applied to terminals 9 and 10 to keep nodes 15 and 16 charged to their initial condition. In order to switch the circuit, the potential on terminal 14 is raised to approximately minus three volts. This operation retards current flow between the source and drain of the "on" transistor 4, and causes the potential on node 16 to rise above threshold to approximately minus five volts, a level sufficient to turn on transistor 3. Once transistor 3 turns on and conduction can occur therein, node 15 discharges and its potential falls below threshold, turning off transistor 4. In summary, the cumulative effect of retarding current flow in transistor 4 causes the circuit to switch from one state to the other.

Other methods of switching the circuit of FIG. 1 in view of the five techniques described above should be apparent to one skilled in the art. For the following description of applications of the circuit of FIG. 1, the five techniques described should provide sufficient information for one to understand how the circuit changes states. However, it is understood that the circuit is not limited to the above described techniques and that numerous others may be employed by a clever artisan.

The basic circuit of FIG. 1 operates with logic information selectively applied to its terminals in the form of differences in voltage levels. Typically, the logic information is supplied by a combination of bit and word lines that are selectively coupled to the circuit of the invention via terminals 9 through 14, with a wide variety of different coupling combinations possible. For example, the circuit of FIG. 3 functions as a four-terminal, differential-sensing, common-source memory cell. Terminals 9 and 10 of FIG. 1 are coupled together to form terminal 35, which provides for word-line input signals to the gate electrodes of MOS resistors 1 and 2. Terminals 36 and 37 (terminals 11 and 12 on FIG. 1) provide for a pair of bit-line input signals to the respective drains of MOS resistors 1 and 2. Finally, terminal 38 comprises terminals 13 and 14 (of FIG. 1) coupled together, and provides for coupling a source of fixed potential, such as ground, to the sources of MOS transistors 3 and 4.

Figure 3:
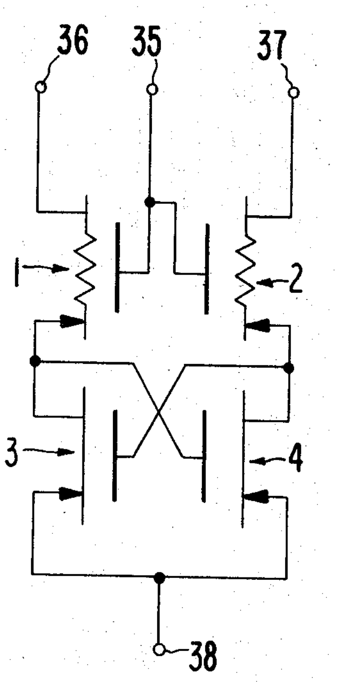
FIGS. 3 through 7 are simplified schematic circuit diagrams of suitable applications of the basic memory cell circuit of FIG. 1.

The circuit of FIG. 3 is capable of having three different modes of operation. The first mode may be referred to as static storage, the second mode as linear half-select, and the third mode as dynamic storage. Under each of the three modes, four different operating conditions may be performed on the circuit. The first is a standby condition, the second is the address function, the third is the read function, and the fourth is the write function.

During the following discussion of the operation of the circuit of FIG. 3, the threshold voltage for turning on each of the active MOS components located therein is assumed to be minus 3.5 volts, although in some cases the threshold voltage may vary between minus three and minus four volts. Also, it is assumed that the circuit is operating in an array of similar circuits, the array having a pluality of word and bit lines appropriately coupled to the terminals of each of the circuits comprising the array. For the first, or static storage, mode of operation, the circuit of FIG. 3 is placed in the standby condition by applying minus twelve volts to the word-line terminal 35, which functions to turn on each of the two MOS resistors 1 and 2, and by applying minus eight volts to each of the bit-line terminals 36 and 37. To address the circuit, minus sixteen volts is applied to the word-line terminal 35 (the potential on all the other word lines in the array is reduced to minus eight volts). Information stored in the circuit may be detected (referred to as the read function) by sensing the differential current between the pair of bit-line terminals 36 and 37. For example, the bit-line terminal corresponding to the on transistor has current flowing therein of approximately 100±20 microamperes, while the current in bit-line terminal corresponding to the off transistor is zero. The presence or absence of current in a particular bit-line terminal can be defined as a logical one or zero. Information is inserted into the circuit (referred to as the write function) by lowering the voltage on a selected bit-line terminal 36 or 37 to minus five volts. All current flowing in the circuit is transferred to the transistor corresponding to the bit-line terminal with the lowered voltage, which turns off the transistor corresponding to the other bit-line terminal.

For the second, or linear half-select, mode of operation, the standby condition is the same as that of the first mode. To address the circuit, minus eighteen volts is applied to the word-line terminal 36. Information is read by detecting the difference in the flow of current in each of the bit-line terminals 35 and 37; that occurs when a particular word line is addressed; this difference is defined as a logical one or zero. Information may be written into the memory cell circuit of FIG. 3 by reducing the voltage on a bit-line terminal from minus eight volts to minus six volts, which is sufficient to switch the state of the components corresponding to the addressed bit-line terminal (but not switch the state of the other circuits in the array).

In the third, or dynamic storage, mode of operation, for the standby condition, less than minus eight volts is applied to the word-line terminal 35 and approximately minus eight volts to the pair of bit-line terminals 36 and 37. To address the circuit, the potential on the word-line terminal 36 is raised to approximately minus sixteen volts. To read information stored in the circuit, the difference between the level of current flowing in the bit-line terminal 36 and that in terminal 37 is compared. To write, the potential on one of the bit-line terminals 36 or 37 is lowered to approximately minus five volts, which is sufficient to transfer current flow to the transistor corresponding to the bit-line terminal having the lower potential and thereby turn off the other transistor.

The three modes of operation described above for the circuit of FIG. 3 may be compared. In the first mode, that of static storage, the potential in all word lines in an array except the word line selected must be substantially changed from the standby level. This approach creates current transients, and is unsatisfactory for many system applications. In the linear half-select approach, mode two, the circuit is patricularly sensitive to changes in threshold voltage, which creates a yield problem. Moreover, the equivalent of an inductor is needed for dynamic current sensing, which may pose a problem when using integrated-circuit processing techniques. The dynamic storage mode (mode three) provides low-power dissipation compared to the other two modes; however, all word lines must be periodically addressed to prevent loss of information in the circuit. The dynamic storage period cannot exceed the natural storage time; however, a safety factor can be incorporated whereby the dynamic storage period is less than one-tenth the natural storage time. This is accomplished by applying a restoring pulse periodically to each circuit to prevent loss of charge.

Figure 4:
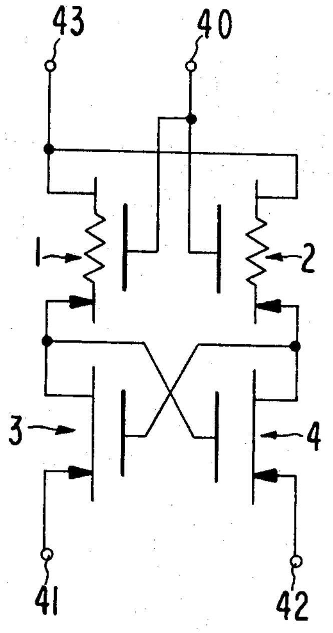

Referring to FIG. 4, the circuit of the invention can function as a four-terminal, differential-sensing, common-drain, memory cell circuit. Here, terminal 40 provides for the application of word-line signals to the gate electrodes of the two resistors 1 and 2. Terminals 41 and 42, on the other hand, provide for the application of a bit-line signal to each source of the respective transistors 3 and 4. A source of fixed potential, such as minus eight volts, may be coupled via terminal 43 to the drains of resistors 1 and 2. The circuit of FIG. 4, similar to that of FIG. 3, has three modes of operation, each mode comprising standby, address, read, and write. During the following description, it is assumed that the circuit is operating in an array of similar circuits interconnected by a plurality of word and bit lines appropriately coupled to the terminals of each. For mode one operation (static storage) the standby condition occurs when a potential of approximately minus twelve volts is applied to the wordline terminal 40 and zero potential is applied to the bit-line terminals 41 and 42. The circuit is addressed by the application of minus sixteen volts to the word-line terminal 40 (the voltage on all the other word lines is lowered to less than minus eight volts). To read, the difference between the level of current flowing in the bit-line terminals 41 and 42 is compared with the current in the bit-line terminal corresponding to the transistor in the on condition being 100±20 microamperes. This current may be defined as a logical one or zero. To write, the potential on one of the bit-line terminals 41 or 42 is raised to minus two volts. All current is transferred to the other bit-line terminal, whereby at zero volts is sufficient to switch the state of the circuit. For the linear half-select operation (mode two), the standby condition is the same as mode one above. To address the circuit, a potential of minus eighteen volts is applied to the word-line terminal (the other word lines in the array are kept at minus twelve volts). To read, the difference in current between bit-line terminals is detected. To write, the potential on a bit-line terminal is raised from zero to minus 0.7 volt which is sufficient potential to switch the circuit to the opposite state (but not sufficient to switch the state of other circuits in the array) and current flow is transferred to the bit-line terminal that is still at zero potential. For dynamic storage opeartion (mode three), standby occurs when less than minus eight volts is applied to the word-line terminal 40 and the bit-line terminals 41 and 42 are at zero potential. To address, the word-line terminal 40 is raised to minus sixteen volts. To read, the difference in current between bit-line terminals 41 and 42 is detected. To write, the potential on one of the bit-line terminals 41 or 42 is raised to minus two volts. All current is transferred to the other bit-line terminal still at zero potential. It should be noted that this mode gives a noise immunity of approximately one volt. An alternative way of operating the cell in the dynamic storage mode comprises raising the potential on the word-line terminal 40 to minus eighteen volts, and then writing into the cell by applying a voltage of 0.7 volt to a bit-line terminal 41 or 42. This alternative approach provides noise immunity of less than approximately 100 millivolts, although smaller differential bit-line voltages are needed for the write function. A voltage swing of only one or two volts is possible, compared to the voltage swing of three or four volts needed by the circuit of FIG. 3. The FIG. 4 circuit needs less charging current for the write condition, which saves on the power dissipation in a digital driver compared to the circuit of FIG. 3. Although the FIG. 4 circuit has less noise margin than that of FIG. 3, the time required for the write function is substantially shorter. Compared to the circuit of FIG. 4, the circuit of FIG. 3 requires a larger differential bit-line voltage and, therefore, more charging current is needed to write and more power is consumed. However, its noise margin is higher because a higher bit-line voltage is needed to switch states. In summary, the circuit of FIG. 3 provides a higher margin of noise immunity, while the circuit of FIG. 4 consumes less power.

Figure 5:
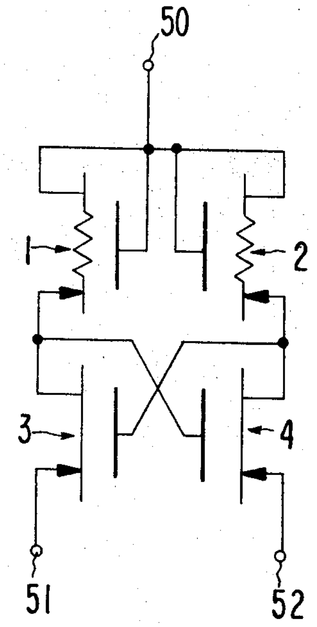

Referring to FIG. 5, the basic circuit of the invention is connected as a three-terminal, differential-sensing, memory cell circuit wherein the terminals 9, 10, 11, and 12 of FIG. 1 are coupled together and to terminal 50, which provides for application of a word-line input signal. A pair of bit-line terminals 51 and 52 function to enable a logical bit signal to be applied to the source of the respective MOS transistors 3 and 4. The circuit of FIG. 5 eliminates the need for connection to a source of fixed potential, which in many applications is an advantageous feature because only three input lines are needed to operate the circuit. The circuit is capable of three modes of operation, similar to those of the circuits of FIGS. 1 and 2, and the following description indicates the necessary input signals for each of the three modes. It is assumed that the circuit is operating in an array comprising a plurality of circuits similar to that of FIG. 5. For mode one operation, the standby condition occurs by the application of a potential of minus twelve volts on the word-line terminal 50 and zero potential on the bit-line terminals 51 and 52. To address, a potential of minus sixteen volts is applied to the word-line terminal 50 (with the potential on the other word-line terminal in the array lowered to minus eight volts). Alternatively, the address function can be accomplished by the application of minus twelve volts applied to the word-line terminal 50 (while the potential on the other word-line terminals in the array is lowered to minus eight volts). This latter approach, however, provides less sensing current and the circuit operates with slower speed. To read, the difference between the level of current on the pair of bit-line terminals 51 and 52 is detected, with the presence or absence of current defined as a logical one or zero. To write, the potential on a bit-line terminal 51 or 52 is raised to minus two volts, thereby causing current flow to be transferred to the other bit-line terminal still at zero potential.

In mode two, the address condition is not independent of the read and write conditions, which may be an impractical mode of operation for some applications. For standby, a potential of minus twelve volts is applied to the word-line terminal 50 and zero potential is applied to the pair of bit-line terminals 51 and 52. For the read condition, first the address is accomplished by the application of minus eighteen volts on the word-line terminal 50 (with less than minus twelve volts applied to the other word-line terminals in the array). Next, the difference in the current level in the pair of bit-line terminals 51 and 52 are sensed, and the presence or absence of current defined as a logical one or logical zero. To write, first the address is accomplished by maintaining the potential on the word-line terminal 50 at minus twelve volts (with the potential on the word-line terminals of the other circuits in the array raised to minus fifteen volts). To write, the potential on a bit-line terminal 51 or 52 is raised from zero to 0.7 volt, which causes the current to transfer to the other bit-line terminal still at zero potential, thereby changing the state of the circuit (but not the state of the other circuits in the array). For operation in the third mode, standby is accomplished by the application of less than minus eight volts on the word-line terminal 50 and zero potential on the bit-line terminals 51 and 52. Address is accomplished when the potential on the word-line terminal 50 is raised to minus sixteen volts. To read, the difference in the current level between the pair of bit-line terminals 51 and 52 is detected, with the presence or absence of current defined as a logical one or logical zero. To write, a bit-line terminal 51 or 52 is raised to minus two volts, which provides noise immunity of approximately one volt. Alternatively, for some applications, if the potential on the word-line terminal 50 is raised to minus eighteen volts, then the write function can be accomplished by raising the potential on a bit-line terminal 51 or 52 to 0.7 volt. However, this alternative approach provides a noise immunity of less than approximately 100 millivolts, but for some applications may be satisfactory.

Figure 7:
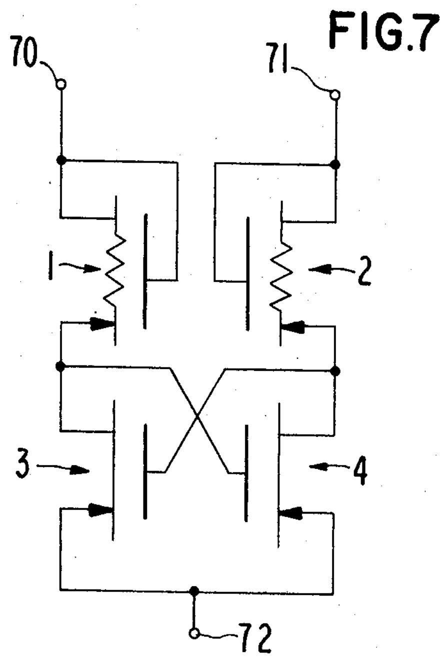

The circuit of FIG. 7 is capable of operation in still another mode, hereafter referred to as the fourth mode, which is similar to dynamic storage described above but eliminates the need of more than one bit-line terminal; instead, a source of fixed potential, such as ground, is coupled to one of the bit-line terminals, such as terminal 52, and operation is accomplished by signals selectively applied to the remaining bit-line terminal 51 and the word-line terminal 50. (The potential on terminals 51 and 52 may be interchanged without departing from the scope of the invention.) For standby condition in the fourth mode, a potential of minus eight volts is applied to the word-line terminal 50, zero potential is applied to the bit-line terminal 51, and the source of fixed potential, such as ground, is applied to terminal 52. To address, the potential on the word-line terminal 50 is raised to minus sixteen volts. To read, the current level, if any, is detected in the bit-line terminal 51, and the presence or absence of current is defined as the logical one or logical zero. To write, the potential on the bit-line terminal 51 may be raised to minus two volts or lowered to plus two volts. For example, to write a logical one into the circuit, a potential of minus two volts may be applied to the bit-line terminal 51. To write a logical zero into the circuit, the potential on the bit-line terminal 51 may be lowered to plus two volts. Note that it is assumed that the substrate potential is at plus two volts, which is necessary in order that the potential on the bit-line terminal 51 does not become more positive than the substrate potential. Alternatively, the substrate may be kept at zero potential and the bit-line at zero potential in standby. To write either a plus 0.7 volt or a minus 0.7 volt can be applied to the bit-line terminal 51, and the word-line potential on terminal 50 increased to minus eighteen volts, which in this condition is sufficient to change the state of the circuit. It will be appreciated that this latter mode of operation is particularly convenient because only one bit-line and only one word-line need be provided for the cell, thereby reducing the amount of area needed per circuit in an array for satisfactory operation, reducing the number of interconnections to the array, and substantially increasing the potential complexity of the array. It should be noted that substrate biasing may be necessary where both positive and negative signals are used on the bit lines. Futhermore, substrate biasing can be used to reduce junction capacitance of an MOS device and thereby improve operating speed of the memory cell circuit.

Figure 6:
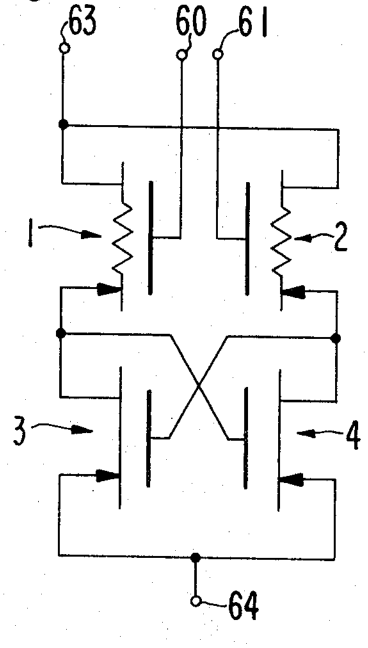

The circuit of the invention can also operate as a four-terminal, sequential-sensing, memory-cell circuit as shown in FIG. 6. Here, the circuit operates in a time-multiplex mode wherein the current flow is detected at the different clock times and compared. A pair of word-line terminals 60 and 61 are provided, with terminal 60 coupled to a gate of MOS resistor 1, and terminal 61 coupled to the gate of MOS resistor 2. Terminal 63 is coupled to the drain of respective MOS resistors 1 and 2, while terminal 64 is coupled to the source of respective MOS transistors 3 and 4.

For common-source operation, a bit line is coupled to terminal 63 and a source of fixed potential, such as ground, is coupled to terminal 64. In the time-multiplex mode, four operating conditions are provided. Standby condition is provided by the application of a potential of less than a minus eight volts to the word-line terminals 60 and 61, and minus ten volts to the bit-line terminal 63. To address, signals of minus eighteen volts from a two-phase clock are selectively applied, phase one to the word-line terminal 60 and phase two to word-line terminal 61. To read, the level of current in the bit-line terminal 63 is detected in coincidence with signals from the two-phase clock applied to the word-line terminals 60 and 61. Current flows in the bit-line terminal 63 in response to one of the two phases, thereby indicating which MOS transistor 3 or 4 is on, and which one is off. The presence of current in phase with one or the other of the two clock signals may be defined as a logical one or logical zero. To write, the potential on the bit-line terminal 63 is lowered to minus five volts in coincidence with the first or second phase of the two-phase clock applied to respective terminal 60 or 61.

The circuit of FIG. 6 is also capable of common-drain operation. More specifically, bit-line signals are applied to terminal 64 while terminal 63 is coupled to a source of fixed potential. This circuit also operates in the time-multiplex mode. Standby occurs by the application of a potential of minus eight volts to the word-line terminals 60 and 61, and zero potential to the bit-line terminal 64. The source of fixed potential coupled to terminal 63 should be minus ten volts. To address, the first phase of the two-phase clock is applied to word-line terminal 60, and the second phase is applied to the word-line terminal 61, with the voltage level of each signal being minus eighteen volts. To read, the level of current on the bit-line 64 is detected in coincidence with each phase of the two-phase clock applied to word-line terminals 60 and 61. To write, the potential on bit-line terminal 64 is raised to minus five volts in coincidence with the first or second phase of the two-phase clock, which functions to switch the state of the circuit.

Using the basic circuit of the invention, a three-terminal, sequential-address circuit can be accomplished. Referring to FIG. 7, terminals 70 and 71 provide word-line inputs, terminal 70 to the drain and gate electrodes of the first MOS resistor 1, and terminal 71 to the gate and drain electrodes of the second MOS resistor 2. Terminal 72 provides a bit-line input to the source electrode of respective MOS transistors 3 and 4. This circuit operates in a manner similar to that of FIG. 6, except that the need for a fourth terminal coupled to a source of fixed potential is eliminated, which is a desirable feature for applications in highly complex arrays where it is necessary to save as much space as possible. For standby, a potential of minus eight volts is applied to the word-line terminals 70 and 71, and zero potential is applied to the bit-line terminal 72. For address, phase signals of minus eighteen volts from a two-phase clock are applied to the word-line terminals 70 and 71, phase one to terminal 70 and phase two to terminal 71. To read, the level of current flowing in the bit-line terminal 72 is detected in coincidence with phase signals from the two-phase clock on the word-line terminals 70 and 71, thereby indicating which transistor 3 or 4 is on and which is off. To write, the potential on bit-line terminal 72 is raised to minus five volts in coincidence with the first or second phase of the clock, which is sufficient to switch the circuit from one state to the other.

Although the memory-cell circuit of the invention may operate in a variety of array configurations, it has been found that the circuits of FIGS. 3 through 7 are well suited for operation in particular kinds of arrays. For example, referring to FIG. 8, an array for applications of the circuit configuration of FIG. 3 or 4 is shown. The array comprises a plurality of memory cell circuits 80 and interconnection lines 81 through 83 and 91 through 96 arranged in rows and columns, with the interconnection lines located adjacent the respective memory cell circuits. In each row, a word-line 81 is coupled to the word-line terminal of each memory cell 80 within that row. In each column, a pair of bit lines 91 and 92 are provided, one bit line 91 coupled to the first bit-line terminal and the other bit line 92 coupled to the second bit-line terminal of each memory cell 80 within that column. Interconnection pads 87 for making ohmic contact to the bit and word lines are located at the end of each row or column. Suitably, for a more covenient layout, the placing of pads for the word and bit lines may be staggered between left and right or top and bottom of the ends of each row or column. A common line 88 is also provided within the array for connecting a source of fixed potential, such as ground, to each memory cell 80.

Figure 8:
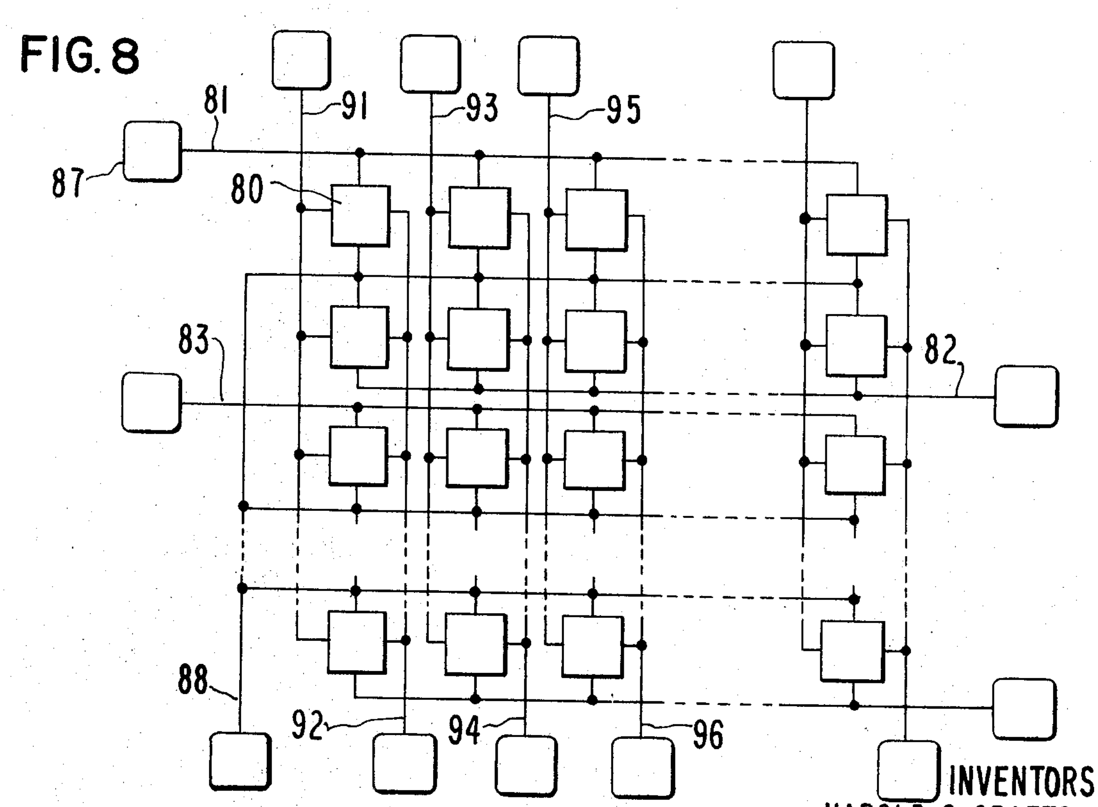
FIG. 8 is a simplified schematic drawing of a large-scale array suitable for the memory cell circuits of FIGS. 3 through 5.

It may be noted that the array of FIG. 8 provides for a pair of bit lines 91 and 92 for each memory cell 80 within a column, a word line 81 for each memory cell 80 within a row, and a common line 88 for each memory cell 80 in the array, which is especially suitable for the four-terminal circuits of FIGS. 3 and 4. Also, it may be noted that the circuit of FIG. 5, which is a three-terminal circuit, may be incorporated in the array of FIG. 8. However, the common line 88 is unnecessary and can be eliminated, so that the array comprises a word line 81 for each row and a pair of bit lines 91 and 92 for each column of memory cells 80.

Figure 9:
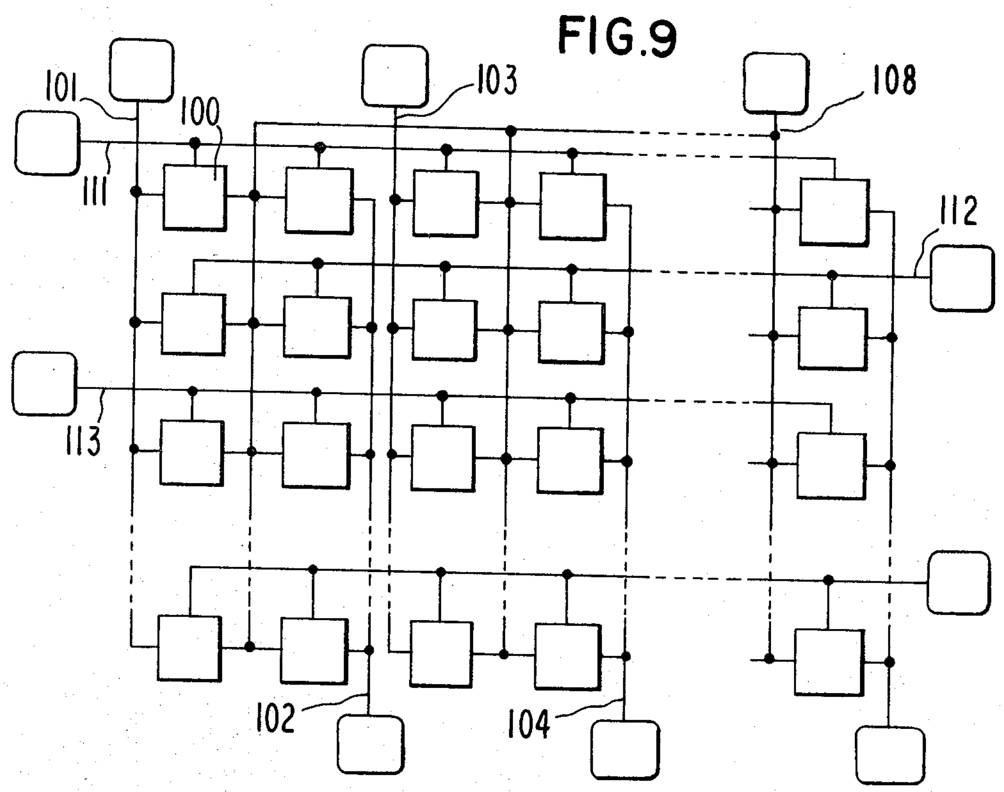
FIG. 9 is a simplified schematic diagram of an alternative large-scale array suitable for the memory cell circuit of FIG. 5, wherein only a minimum number of interconnect lines are needed.

Referring to FIG. 9, an array configuration particularly suitable for the circuit of FIG. 5 when it is operating in the fourth mode is shown. The array comprises a plurality of memory cells 100 arranged in rows and columns, with a bit line 101 through 104 located adjacent to each column and a word line 111 through 113 located adjacent to each row of memory cells 100. Each bit line 101 is coupled to each memory cell 100 within the column, and each word line 111 is coupled to each memory cell 100 within the row. A common line 108 is also provided so that a source of fixed potential may be coupled to each memory cell 100. Because only one bit line 101 and one word line 111 are needed to operate a memory cell 100, one line per column of memory cells is eliminated by the array of FIG. 9 compared to that of FIG. 8, thereby substantially reducing the amount of space needed per cell and the number of interconnections needed for the array, and enabling the fabrication of a more highly complex array.

Figure 10:
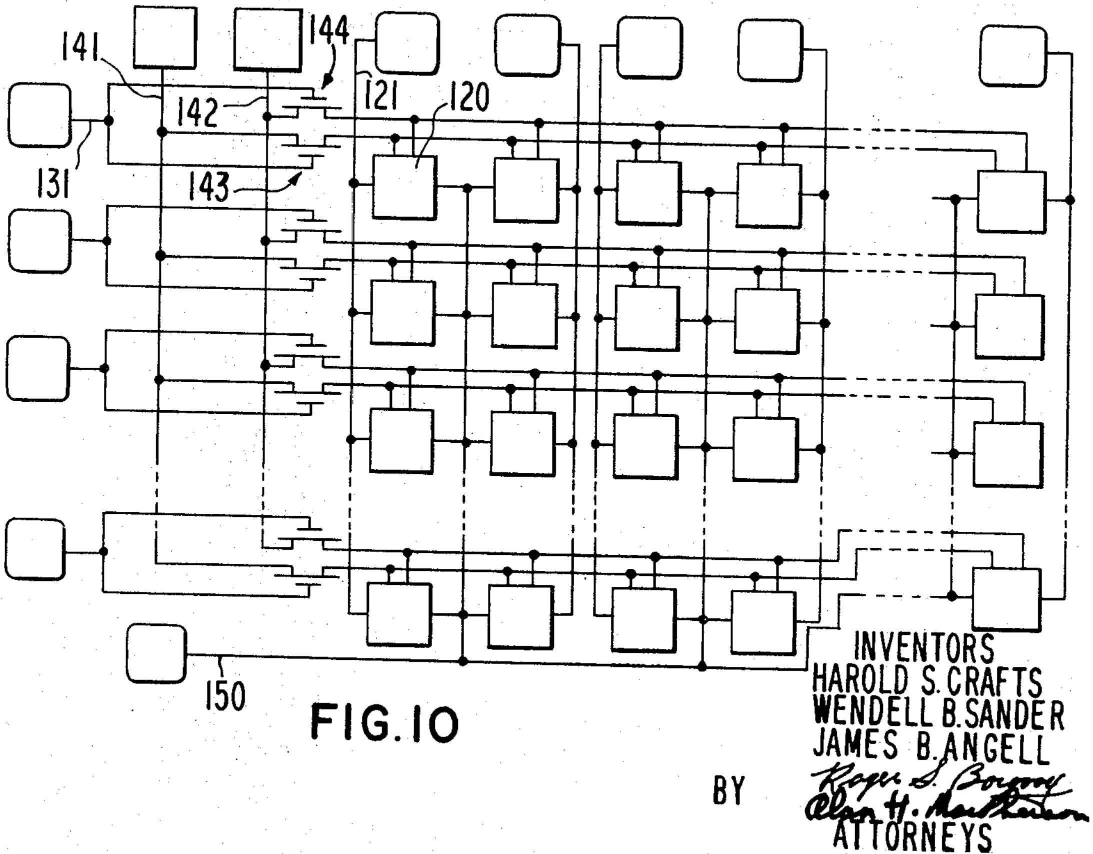
FIG. 10 is a simplified schematic diagram of a large-scale array particularly suitable for the memory cell circuit of FIGS. 6 and 7.

Referring to FIG. 10, an array particularly suitable for the circuit of FIG. 6 is shown. The array comprises a plurality of memory cells 120 arranged in rows and columns, with a bit line 121 provided for each column and coupled to each memory cell 120 within the column, and a word line 131 provided for each row of memory cells 120. A pair of clock phase lines 141 and 142 are also provided, and are arranged in cooperation with each word line 131, whereby the word line 131 of each row controls the coupling between the first phase line 141 and the first word-line terminal and between the second phase line 142 and the second word-line terminal of each memory cell 120 in the row. As shown in FIG. 10, a convenient way of selectively applying two-phase clock signals to the memory cells 120 comprises coupling the first phase line 141 to one side of a first transistor, with the other side of the transistor coupled to the first word-line terminal of each memory cell 120 in a row, and coupling the second phase line 142 to one side of a second MOS transistor 144 and coupling the other side of the second transistor to the second word-line terminal of each memory cell 120 in the row. Next, the word line 131 for the row is coupled to each gate electrode of the two transistors 143 and 144, and functions to turn on the transistors 143 and 144 so that when a phase signal is applied to one of the phase lines 141 or 142, the clock phase signal is applied to the first or second word-line terminal of each memory cell 120 in the row.

A common line 150 is provided in the array for the application of a signal from a source of fixed potential to each memory cell 120. It should be noted that the circuit of FIG. 7 may also be incorporated into the array of FIG. 10. However, since the FIG. 7 circuit needs only three terminals, the common line 150 of the FIG. 10 array may be eliminated, thereby substantially increasing the potential complexity of the array.

Figure 11:
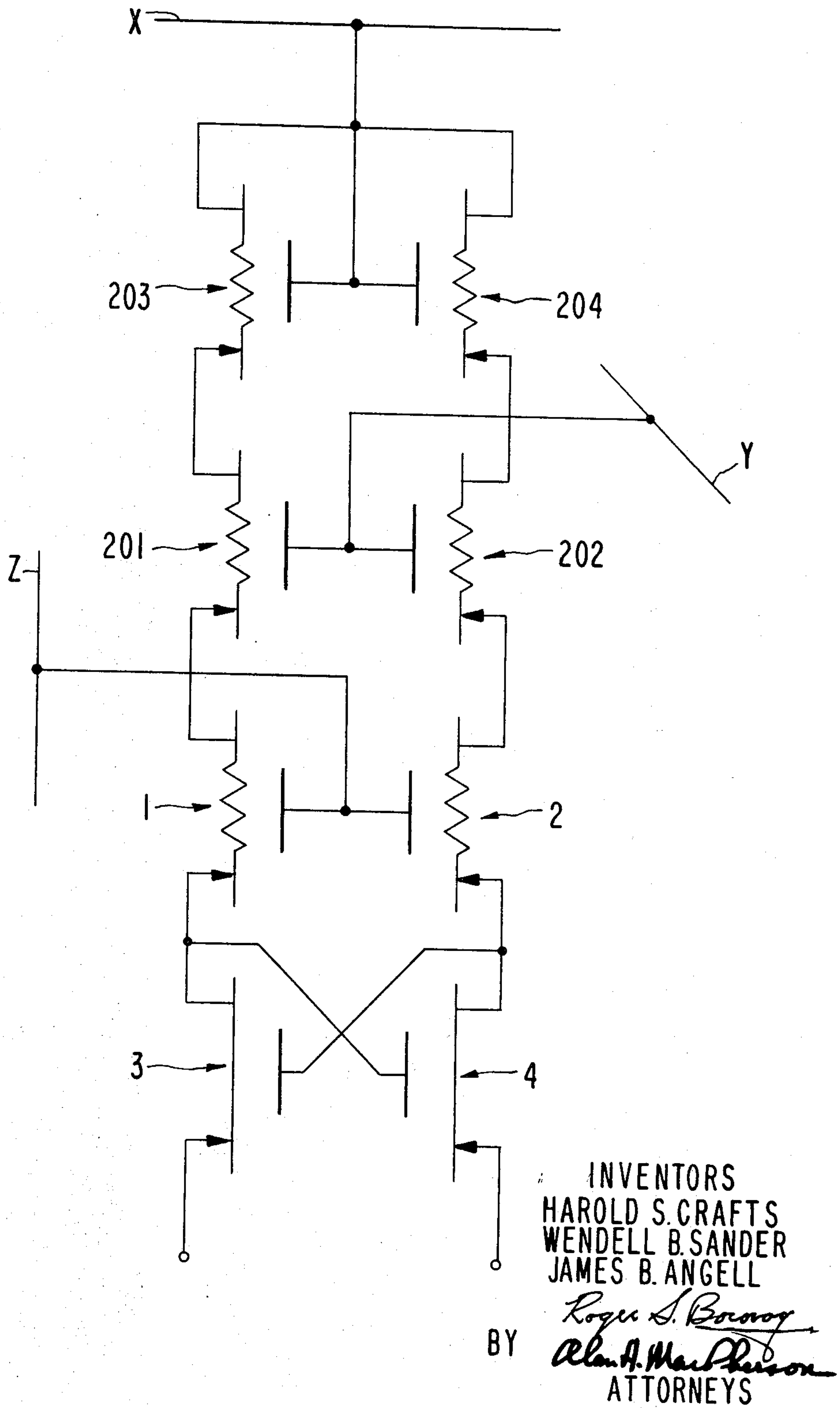
FIG. 11 is a simplified schematic circuit diagram wherein the basic circuit of FIG. 1 has been modified to include a plurality of resistor pairs coupled to the basic resistors to provide for multidimensional decoding.

While the invention has been described with reference to particular embodiments and applications, the scope of the invention is not limited to these but may be susceptible to numerous other applications and embodiments which will be readily apparent to one skilled in the art. One example of a modification to the basic circuit of the invention comprises a plurality of MOS resistor pairs 201 through 204 coupled in series to the pair of MOS resistor pairs 201 through 204 coupled in series to the pair of MOS resistors of the basic circuit to provide for multidimensional decoding via lines X, Y, and Z, as shown in FIG. 11. Moreover, the MOS components may be selected from MOS enhancement-mode types other than the P-channel ones described above for the particular embodiments and shown in the drawings. For example, N-channel and complementary MOS enhancement-mode components may be used in the invention, provided that appropriate changes are made in the polarity of the applied signals where applicable, and appropriate biasing of the substrate is provided (note that substrate biasing can be used to increase the threshold of an MOS device and thereby convert a normally "on" N-channel device to one that is normally "off"). In general, any enhancement-mode, field-effect transistor (FET) may be used, provided that the transconductance thereof is a function of the surface geometry, or the gate dielectric thickness, or both, and provided that the input-output relationship of the entire cell is such that no other components are needed for biasing. Furthermore, the scope of the invention is applicable to MOS (and FET) depletion-mode devices, provided that additional biasing resistors are added to the basic circuit.

What is claimed is:

1. A complete semiconductor memory cell circuit comprising:

first and second resistors having respective source and drain electrodes, a channel region located therebetween, a gate electrode overlying the channel region, and the resistive value of each resistor responsive to changes in the voltage level of signals applied to the electrodes thereof;

first and second transistors having respective source and drain electrodes, a channel region located therebetween, a gate electrode overlying the channel region, the drain of the first transistor responsively coupled to the source of the first resistor and to the gate of the second transistor, the drain of the second transistor responsively coupled to the source of the second resistor and to the gate of the first transistor; and, a plurality of terminals selectively coupled to the respective drain and gate electrodes of the first and second resistors, and to the source electrodes of the first and second transistors, whereby when signals in the form of differences in voltage levels are selectively applied to the terminals, logic information may be applied to, stored in, and at a later time read out of the memory cell.

2. The circuit recited in claim 1 wherein the channel regions are of a positive-type polarity.

3. The circuit recited in claim 1 wherein the channel regions are of a negative-type polarity.

4. The circuit recited in claim 1 wherein the channel regions are of a complementary type.

5. The circuit recited in claim 1 further defined by a layer of dielectric material located between each respective gate electrode and channel region.

6. The circuit recited in claim 5 wherein the dielectric material comprises an oxide.

7. The circuit recited in claim 6 wherein the oxide underlying the respective gate electrode of the first and second resistors has a thickness at least four times greater than that of the first and second transistors.

8. The circuit recited in claim 5 wherein the dielectric material comprises a nitride.

9. The circuit recited in claim 1 wherein the gate electrode comprises metal.

10. The circuit recited in claim 1 wherein the gate electrode comprises a conductive semiconductor material.

11. The circuit recited in claim 10 wherein the gate electrode comprises silicon having appropriate impurities deposited therein.

12. The circuit recited in claim 1 wherein the ratio of channel width to channel length of each of the resistors is approximately one-half, and the ratio of channel width to channel length of each of the transistors is approximately two.

13. The circuit recited in claim 1 wherein the geometric gain is greater than two.

14. The circuit recited in claim 1 wherein the geometric gain is less than ten.

15. The circuit recited in claim 1 further defined by a plurality of pairs of resistors selectively coupled to the pair of resistors of the basic circuit to provide multidimensional decoding.

16. The circuit recited in claim 1 wherein the plurality of terminals comprise:

a first terminal coupled to the gate electrodes of the first and second resistors for providing selective address;

a second terminal coupled to the drain electrode of the first MOS resistor;

a third terminal coupled to the drain electrode of the second resistor, the second and third terminals providing for selectively applying information in the form of differences in voltage levels for storage in the memory cell, and for selectively reading by differentially sensing the stored information at a later time; and a fourth terminal coupled to the source electrodes of the first and second transistors for applying a point of fixed potential thereto, whereby the circuit is capable of operation as a four-terminal, common-source, differential-sensing memory cell.

17. The circuit recited in claim 1 wherein the plurality of terminals comprise:

a first terminal coupled to the gate electrodes of the first and second resistors for providing selective address;

a second terminal coupled to the drain electrodes of the first and second resistors for applying a source of fixed potential thereto;

a third terminal coupled to the source electrode of the first transistor; and, a fourth terminal coupled to the source electrode of the second transistor, the third and fourth terminals providing for selectively applying information in the form of differences in voltage levels for storage in the memory cell and for selectively reading by differentially sensing the stored information at a later time, whereby the circuit is capable of operation as a four-terminal, common-drain, differential-sensing memory cell.

18. The circuit recited in claim 1 wherein the plurality of terminals comprise:

a first terminal coupled to the gate electrode of the first resistor;

a second terminal coupled to the gate electrode of the second resistor, the first and second terminals providing for sequential and selective address;

a third terminal coupled to the drain electrodes of the first and second resistors for selectively applying information in the form of differences in voltage levels for storage in the memory cell and for selectively reading the stored information at a later time; and a fourth terminal coupled to the source electrodes of the first and second transistors for applying a source of fixed potential thereto, whereby the circuit is capable of operation as a four-terminal, common-source, sequential-sensing memory cell.

19. The circuit recited in claim 1 wherein the plurality of terminals comprise:

a first terminal coupled to the gate electrode of the first resistor;

a second terminal coupled to the gate electrode of the second resistor, the first and second terminals providing for sequential and selective address;

a third terminal coupled to the drain electrodes of the first and second resistors for applying a source of fixed potential thereto; and a fourth terminal coupled to the source electrodes of the first and second transistors for selectively applying information in the form of differences in voltage levels for storage in the memory cell and for selectively reading the stored information at a later time, whereby the circuit is capable of operation as a four-terminal, common-drain, sequential-sensing memory cell.

20. The circuit recited in claim 1 wherein the plurality of terminals comprise:

a first terminal coupled to the drain and gate electrodes of the first and second resistors for providing selective address;

a second terminal coupled to the source electrode of the first resistor;

a third terminal coupled to the source electrode of the second transistor, the second and third terminals providing for selectively applying information in the form of differences in voltage levels for storage in the memory cell and for selectively reading by differentially sensing the stored information at a later time, whereby the circuit is capable of operation as a three-terminal, differential-sensing memory cell.

21. The circuit recited in claim 20 wherein a source of fixed potential is applied to the second terminal.

22. The circuit recited in claim 20 wherein a source of fixed potential is applied to the third terminal.

23. The circuit recited in claim 1 wherein the plurality of terminals comprise:

a first terminal coupled to the drain and gate electrodes of the first resistor;

a second terminal coupled to the drain and gate electrodes of the second resistor, the first and second terminals providing for the application of sequential and selective address; and a third terminal coupled to the source electrodes of said first and second transistors for selectively applying information in the form of differences in voltage levels for storage in the memory cell and for selectively reading the stored information at a later time, whereby the circuit is capable of operation as a three-terminal, sequential-sensing memory cell.

24. The circuit recited in claim 23 wherein a source of fixed potential is applied to the second terminal.

25. The circuit recited in claim 23 wherein a source of fixed potential is applied to the first terminal.

26. A complete semiconductor memory cell circuit comprising:

first and second four-electrode amplifying means capable of functioning as load resistors and gating elements, and having resistive values responsive to changes in the voltage level of signals applied to the electrodes thereof;

third and fourth four-electrode amplifying means capable of storing logic information applied to the electrodes thereof, the first and third means responsively coupled to each other, the second and fourth means responsively coupled to each other, the third and fourth means responsively cross-coupled to each other for stability;

a plurality of terminal means selectively coupled to the amplifying means, whereby when signals in the form of differences in voltage levels are selectively applied to the terminal means, logic information may be applied to, stored in, and a later time read out of the memory cell.

27. The circuit recited in claim 26 wherein each amplifying means comprises:

a substrate of semiconductor material of one conductivity type having a surface;

source and drain regions of opposite conductivity type located within the substrate and extending from the surface, the two regions spaced apart from each other to form a channel region therebetween extending from the surface;

a gate located over the channel region to control the conductivity thereof;

a layer of dielectric material interposed between the gate and the surface; and a respective electrode coupled to the source, drain, gate, and substrate for applying an electrical signal thereto.

28. The circuit recited in claim 27 applied to large-scale integration.

References Cited

UNITED STATES PATENTS

| | | | |
|---|---|---|---|
| 3,363,115 | 1/1968 | Stephenson | 307—279 |
| 3,218,613 | 11/1965 | Gribble | 340—173 |

OTHER REFERENCES

IBM Technical Disclosure Bulletin, vol. 11, No. 3, August 1968, pp. 335–336.

"Monolithic Memory Cell," by Wiedmann.

TERRELL W. FEARS, Primary Examiner

U.S. Cl. X.R.

307—279, 299

Notice of Adverse Decision in Interference

In Interference No. 98,329, involving Patent No. 3,530,443, H. S. Crafts, W. B. Sander and J. B. Angell, MOS GATED RESISTOR MEMORY CELL, final judgment adverse to the patentees was rendered Dec. 18, 1974, as to claims 1, 2, 5, 6, 9, 14, 16 and 26–28.

[*Official Gazette May 6, 1975.*]